United States Patent [19]
Kappas

[11] 3,941,198
[45] Mar. 2, 1976

[54] DETACHABLE POWER UNIT FOR A GOLF BAG CART

[76] Inventor: Chris S. Kappas, 218 - 13th St., Racine, Wis. 53403

[22] Filed: Aug. 29, 1974

[21] Appl. No.: 501,635

[52] U.S. Cl. .............. 180/11; 180/19 H; 180/25 A; 180/65 R; 280/DIG. 5; 318/301; 318/139; 318/349
[51] Int. Cl.² .................... B60K 1/04; B62D 51/04
[58] Field of Search ...... 180/11, 12, 13, 19 R, 19 S, 180/19 H, 65 R, 26 R, 25 A; 280/DIG. 5; 318/301, 305, 349, 139

[56] References Cited
UNITED STATES PATENTS

| | | | |
|---|---|---|---|
| 2,731,096 | 1/1956 | Thelander | 180/13 X |
| 2,812,824 | 11/1957 | Adams | 180/19 S |
| 2,879,858 | 3/1959 | Thomas | 180/19 S |
| 3,059,713 | 10/1962 | Beggs | 180/13 |
| 3,087,562 | 4/1963 | Harks | 180/11 |
| 3,199,621 | 8/1965 | Seaman | 180/11 |
| 3,232,367 | 2/1966 | York | 180/19 R |
| 3,364,417 | 1/1968 | Norton | 180/19 R X |
| 3,561,555 | 2/1971 | Carmichael | 180/11 |
| 3,731,756 | 5/1973 | Hajec | 280/DIG. 5 X |

FOREIGN PATENTS OR APPLICATIONS
789,810  1/1958  United Kingdom.................. 180/12

Primary Examiner—Robert R. Song
Assistant Examiner—John P. Silverstrim
Attorney, Agent, or Firm—James E. Nilles

[57] ABSTRACT

A compact, light weight and easily detachable power unit for driving a golf bag cart by means of an electric motor carried by the unit. The unit includes an articulated frame having an attaching portion which is quickly attachable to or detachable from the frame of the golf bag cart and this attaching frame also carries the battery. The articulated frame also includes a motor and wheel driving frame which is pivotally mounted to the attaching frame about a generally vertical axis and extends generally downwardly and rearwardly therefrom and has a ground wheel at the lower end thereof for castering relative to the attaching frame. An electrical control circuit includes an electric motor carried by the wheel driving frame and also includes the battery, a transistor, a resistor, and a manually operated variable resistor controller on the golf bag cart to infinitely vary the driving speed of the motor.

7 Claims, 7 Drawing Figures

DETACHABLE POWER UNIT FOR A GOLF BAG CART

BACKGROUND OF THE INVENTION

There have been numerous attempts to provide compact power units for attachment to a golf bag cart and a number of these have proven to be satisfactory to some extent. On the other hand, some of them have had shortcomings which included the inability to easily turn and maneuver the golf cart, particularly on cramped to close quarters. Examples of one type of these prior art devices are shown in the U.S. Pat. Nos. 2,903,082, issued Sept. 8, 1959; U.S. Pat. No. 3,094,185 issued June 18, 1963; 3,561,555 issued Feb. 9, 1971; and 3,815,699 issued June 11, 1974. These attachments combined the drive wheels, battery and motor onto one frame, which frame was then attached rigidly to the frame of the golf cart.

Other examples of prior art devices of this generaly character are shown in the U.S. Pat. Nos. 3,199,621 issued Aug. 10, 1965; and 3,330,371 issued July 11, 1967. The devices shown in these two patents had the driven wheels and the power units therefor mounted on one frame, which frame was then swivelly or swingably mounted to the frame of the golf bag cart.

SUMMARY OF THE PRESENT INVENTION

The present invention provides a detachable power unit for a golf bag cart which has an articulated frame that is quickly detachable to the golf bag cart. The frame includes an attaching frame which carries the battery and which is detachably connected at transversely spaced locations to the golf bag cart, for example to the transverse axis of the wheels of the golf bag cart. The articulated frame also includes a motor and wheel driving frame which supports an electric motor, the driving wheel, and gear and chain connection means between the electric motor and driving wheel. The motor and wheel driving frame is pivoted to the attaching frame about a generally vertical axis and the wheel driving frame extends downwardly and rearwardly from its pivot connection to the attaching frame, thus providing a castering effect for the driving wheel. An electrical control circuit is provided which includes the battery and electric motor, a fixed resistor, a transistor, and furthermore includes a manually operated variable speed controller, including a variable resistor, on the cart whereby the speed of the electric motor and consequently the speed of the driving wheel can be infinitely varied within its design limits.

The present invention provides a particularly maneuverable and easily handled detachable power unit for a golf bag cart and which is under positive and precise control of the operator at all times. The unit can be quickly disassembled from the golf bag cart and the articulated frame can furthermore be disassembled so that the attaching frame and its battery are separate from the motor and wheel driving frame.

These and other objects and advantages of the present invention will appear hereinafter as this disclosure progresses, reference being had to the accompanying drawings.

DESCRIPTION OF A PREFERRED EMBODIMENT

Figure 1:
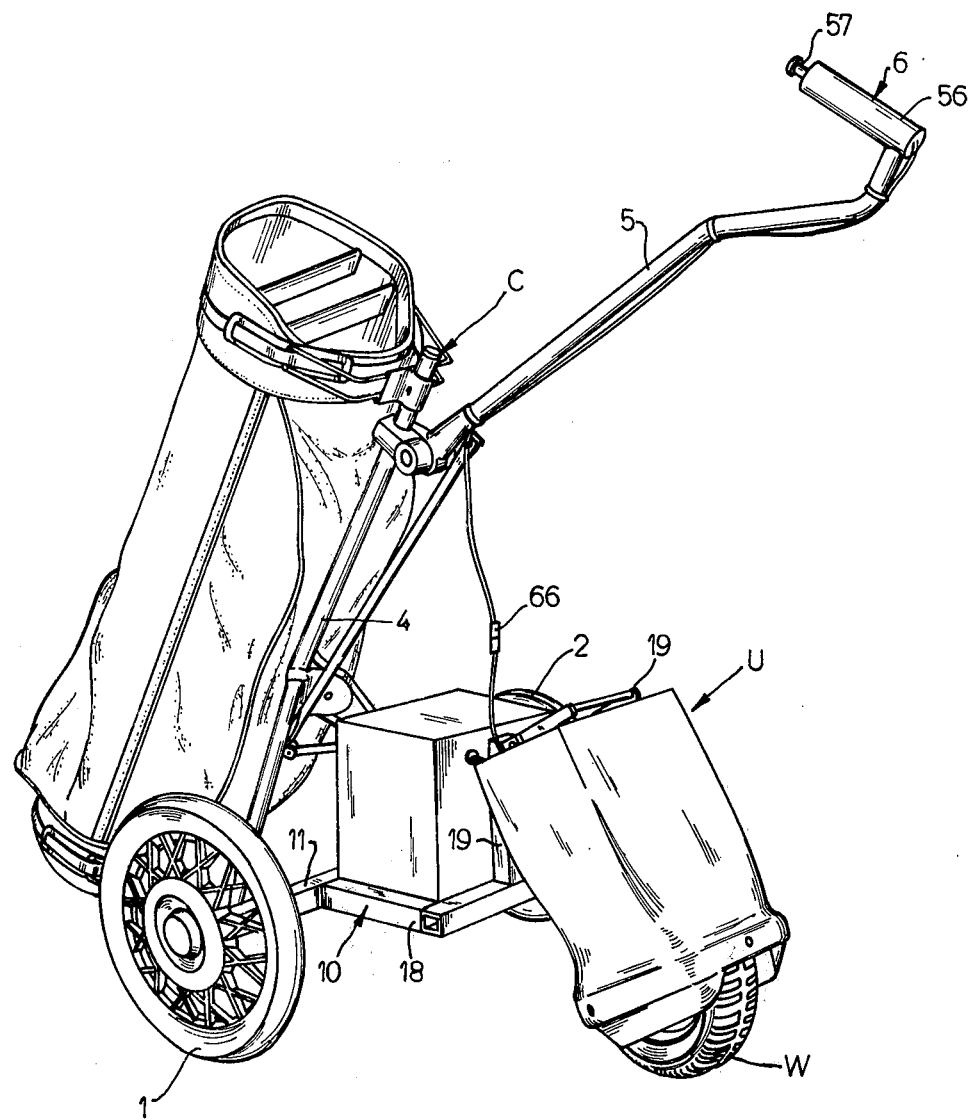
FIG. 1 is a perspective view of a detachable power unit made in accordance with the present invention and attached to a conventional golf bag cart.

The power unit provided by the present invention is shown in FIG. 1 as attached to a conventional cart C which includes a pair of ground support wheels 1 and 2 that are journalled at opposite ends of the transversely positioned shaft means 3, which means in turn is rigidly attached to the frame 4 of the cart. The cart also includes a rearwardly extending handle 5 on the upper end of which is a manually operated variable controller 6 to be described in further detail.

Figure 2:
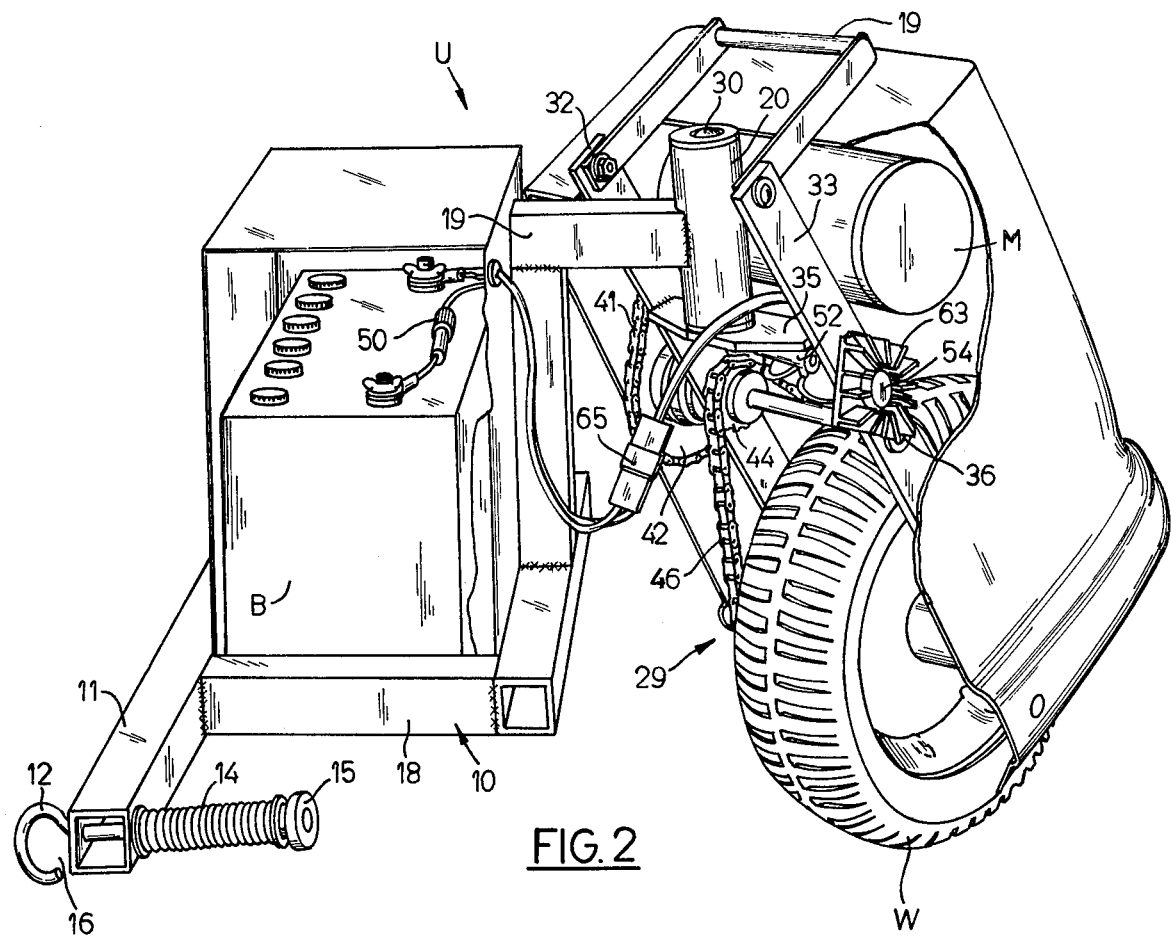
FIG. 2 is a perspective view of the power unit shown in FIG. 1, but on an enlarged scale, certain parts being shown as broken away or removed for the sake of clarity, and the caster wheel being shown as turned relative to the attaching frame.
Figure 3:
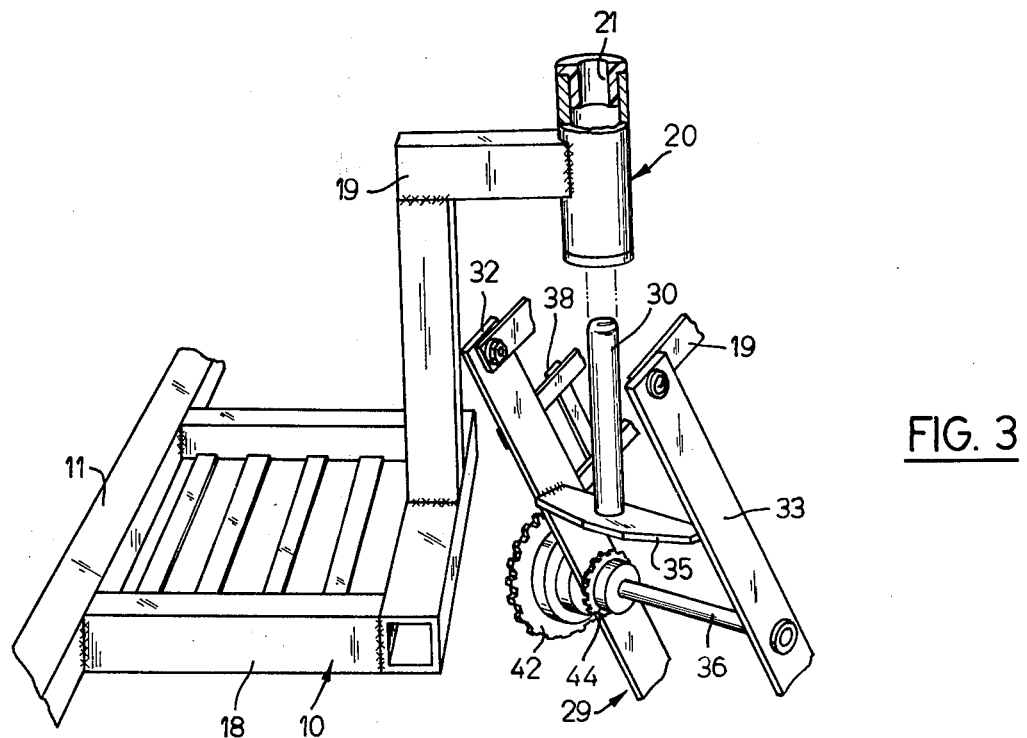
FIG. 3 is a perspective, fragmentary view of the arrangement shown in FIG. 2, and showing the attaching frame and motor and wheel driving frame in exploded position.
Figure 4:
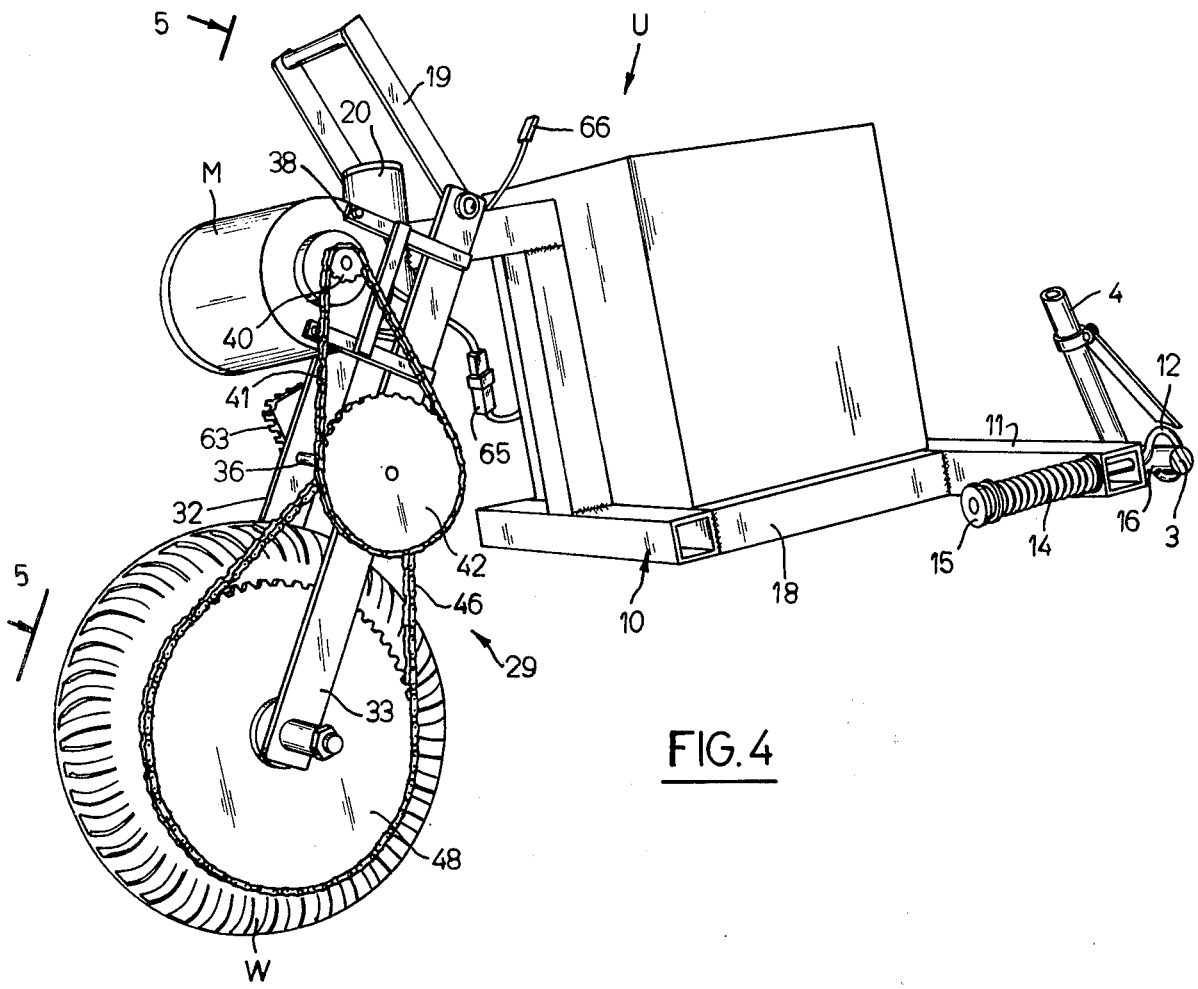
FIG. 4 is another perspective view of the unit shown in FIG. 2, but from the opposite side thereof and certain parts being shown as removed for the sake of clarity.
Figure 5:
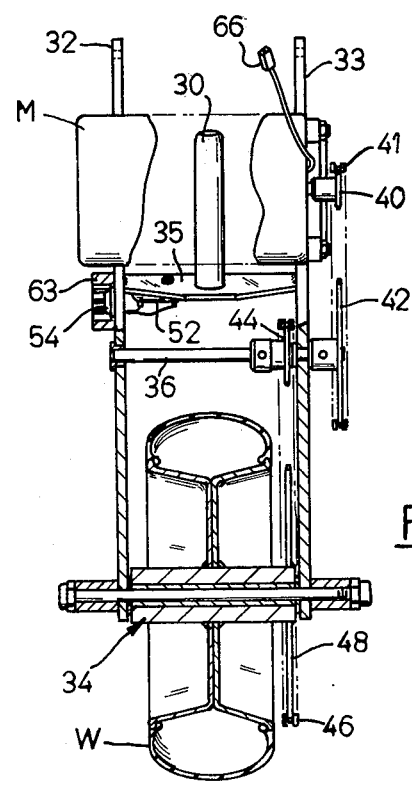
FIG. 5 is a general view taken generally along the line 5—5 in FIG. 4, certain parts shown as broken away or in section.

The detachable power unit U itself is also shown in FIGS. 2 and 4 and includes an attaching frame 10 having a transversely positioned member 11 that can be positioned parallel to and behind shaft means 3 of the golf bag cart. Means are provided on the member 11 for detachably and quickly connecting the unit to the golf bag cart, and this means includes an eye bolt 12 extending through each of opposite ends of the member 11. A spring 14 is mounted on the eye bolt and is held captive thereon by means of an end collar 15 and this spring acts to draw the eye portion of the bolt firmly towards the member 11. The eye of the bolt is of sufficient diameter and has a sufficient opening 16 (FIG. 2) so as to receive the shaft means 3 and the spring 14 then embraces the shaft means 3. Thus, the transversely arranged and widely spaced spring loaded attaching means permits easy attachment of the unit to the conventional golf bag cart. When the operator is walking with the motorized cart and holding the cart by its handle 5, the handle can be swung to a convenient position about the shaft means 3 and otherwise independently of the power unit U.

The attaching frame 10 also includes a generally rectangular frame portion 18 in which the battery B is supported. The attaching frame also includes an upwardly and rearwardly extending portion 19 that has a generally vertically arranged sleeve means 20 fixed at the upper, rearward end thereof, including an inner sleeve 21.

The articulated frame of the power unit also includes a generally downwardly and rearwardly extending motor and wheel driving frame 29 comprising a generally vertically arranged shaft 30 which is journalled in the sleeve means 20 to form a generally vertical pivot axis therewith and between the attaching frame and driving frame. The driving frame also includes a pair of laterally spaced apart, downwardly and rearwardly extending frame members 32 and 33 arranged in parallelism and having a cross member 35 welded therebetween and to which the vertical shaft 30 is also rigidly attached. A sprocket shaft 36 is rotatably journalled in and between the parallel members 32 and 33 and a rubber tired ground, driving wheel W is also journalled in and between the lower ends of the members 32 and 33 by suitable anti-friction bearing means 34 of conventional character.

An electric motor M is mounted on the driving frame by means of the bracket 38 (FIG. 4). Gear and endless roller chain means are connected between the electric motor M and drive wheel W as follows. A small drive sprocket 40 is attached to the motor shaft and an endless roller chain 41 is trained around sprocket 40 and also around a larger sprocket 42 which is fixed to the shaft 36. A smaller sprocket 44 is also fixed to shaft 36 and an endless chain 46 is trained around sprocket 44 and also around a large sprocket 48 that is fixed with wheel W. Consequently, the endless chain and sprocket connected between electric motor M and wheel W forms a speed reduction device and thereby the motor drives the wheel in accordance with the speed of the variable speed motor.

Figure 7:
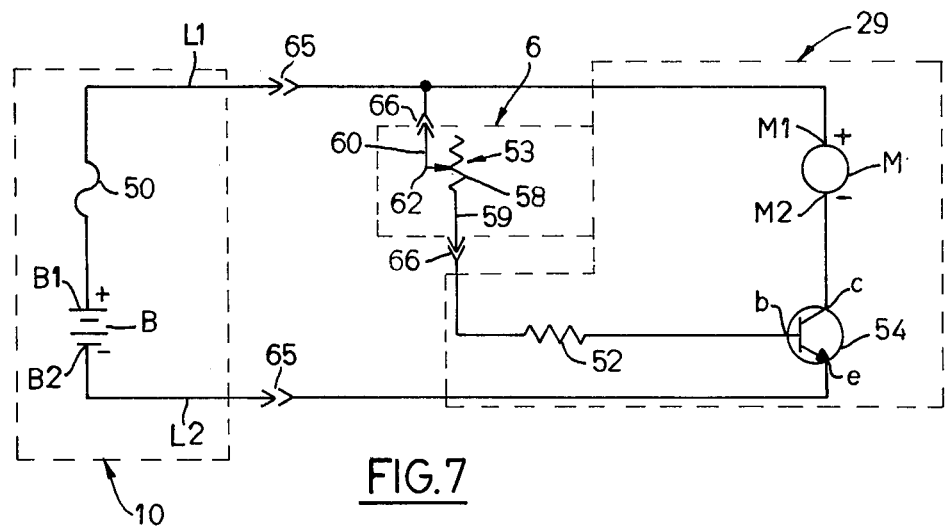
FIG. 7 is an electrical diagram of the control circuit used with the present invention.
Figure 6:
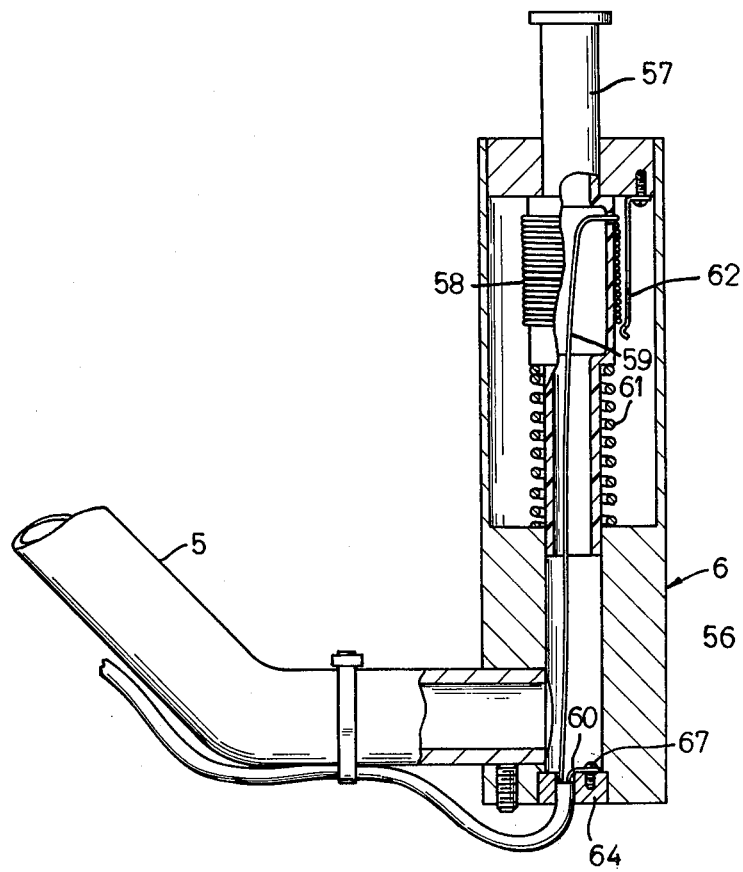
FIG. 6 is a cross sectional enlarged view of the manual controller shown in FIG. 1.

An electrical control circuit as shown in FIG. 7 is provided for the power unit and this circuit includes, for example, the storage battery B which may be of the 12 volt d.c. type, a fuse 50 which may be of a 20 ampere rating, the variable speed d.c. type electric motor M, a fixed resistor 52, a variable resistor 53, and a transistor 54. The positive terminal B1 of the battery B is connected through fuse 50 to terminal M1 of motor M by means of a conductor L1. The negative terminal B2 of battery B is connected through the collector-emitter circuit (c, e) of transistor 54 to terminal M2 of motor M by a conductor L2. The base b of transistor 54 is connected in series with fixed resistor 52, a conductor 59, variable resistor 53 and a conductor 60 to a point on conductor L1 between battery terminal B1 and motor terminal M1. The emitter-collector circuit of transistor 54 (which, for example, is an NPN type silicon power transistor operable in the twelve volt range and capable of handling up to 30 amperes of current) is normally open but is switchable to a conductive state when a biasing signal is applied to its base terminal b from battery B by manipulation of variable resistor 53. As FIG. 2 shows, transistor 54 is mounted on a heat sink 63 which in turn is mounted on frame member 33. As the resistance of variable resistor 53 is decreased, the bias on the base of transistor 54 is correspondingly increased and the current flow through the emitter-collector circuit of transistor 54 is increased to increase the speed of motor M. Thus, changing the bias on transistor 54 by means of variable resistor 53 regulates the speed of motor M which is thus infinitely variable within the motor's design limits. The circuit also includes the manually operated hand control 6, previously mentioned, as being located on the end of the cart handle 5 and in which variable resistor 53 is embodied. Handle 5 and hand control 6 are shown in detail in FIG. 6 and hand control 6 includes a tubular handle portion 56, formed of electrically conductive metal, and a shiftable plunger portion 57 made of plastic and having a bare-wire resistance winding 58 of variable resistor 53 wound therearound, which winding is connected at one end by wire 59 into the circuit as shown in FIG. 7. The wire 60 shown in FIGS. 6 and 7 is attached and electrically connected by a screw 67 to a conductive metal plug 64 friction-fitted in tube 56 of the handle 6. Thus, wire 60 is electrically connected to a spring type pick-off finger 62 which is also part of variable resistor 53 and contacts the winding 58 at a desired location, depending on the position of the plunger 57. Shifting of the plunger 57 is normally biased upward (with respect to FIG. 6) by a coiled biasing spring 61 to a position wherein finger 62 is not engaged with winding 58 and in this open-circuit position no bias is applied to transistor 54 and motor M is deenergized. Consequently, the operator only has to push the plunger 57 downwardly with his finger, for example, to initially close the circuit (to bias transistor 54 on) and to gradually decrease the resistance value of resistor 53 and thereby increase the speed of motor M and the drive wheel W. The speed of motor M is thus infinitely variable within its design limits. To facilitate separation of the attaching frame 10 and the driving frame 29, the conductors L1 and L2 are provided with a separable connector 65. To facilitate separation of frame 29 from the golf cart, the conductors 59 and 60 are provided with a separable connector 66. As FIG. 7 makes clear, when the frames 10 and 29 are detached from the golf cart, the only electrical component remaining on the cart is the control handle 6, its conductors 59, 60, and a portion of plug or connector 66. Furthermore, it is advantageous to deploy the electrical components as shown in FIG. 7, both from a weight distribution standpoint, as well as from an electrical standpoint. For example, when the golf cart and the frames 10 and 29 are separated, accidental damage to the wiring on the cart or on unit 29 cannot cause a short circuit or a drain on battery B. On the other hand, when in service, unit 10 is electrically insulated from unit 29 by the inner sleeve 21 which is formed of low friction material which also serves as an electrical insulator between the units. Furthermore, it is more advantageous from the heat dissipation standpoint for the transistor heat sink 63 to be located on unit 29 rather than on unit 10 because battery B may itself give off heat to frame 10 during prolonged use at high current levels.

The detachable power unit provided by the present invention thus has an articulated frame comprised of an attaching frame and a driving frame which are closely coupled together about a generally vertical pivot axis. The golfer can easily turn and maneuver the entire unit by simply swinging the handle 5 in a desired direction which causes castering of the motor and wheel driving frame in an appropriate direction, the unit being under driving influence of the wheel at all times. The entire unit can be quickly attached or detached from the standard wheel shaft means 3 of the wheel cart C and its widely spaced detaching means 12 provide good stability for the unit on the cart. The unit itself can be disassembled by simply lifting the attaching frame upwardly off the shaft 30 of the wheel driving frame, and the wheel drive frame can then be conveniently carried by the handle 19 which is swingably mounted at the upper end of the frame.

I claim:

1. In combination, a golf cart having a handle and a pair of laterally spaced-apart ground engaging wheels; and a detachable power unit for said golf cart comprising:

an attaching frame;
first pivotal attachment means at one end of said attaching frame for detachably connecting said attaching frame to said golf cart and to enable relative pivotal movement between said attaching frame and said golf cart about a horizontal axis;

a driving frame;

second pivotal attachment means at an opposite end of said attaching frame for detachably connecting said driving frame to said attaching frame and to enable relative pivotal movement between said driving frame and said attaching frame about a vertical axis, said second pivotal attachment means comprising a sleeve and a shaft and electrically non-conductive bearing means between said sleeve and said shaft to electrically insulate said attaching frame from said driving frame;

an electrical battery rigidly and stationarily mounted on said attaching frame between said ends;

a ground wheel journalled for rotation on said driving frame rearwardly of said second pivotal attachment means, said driving frame being swingably mounted on said bearing means about said vertical axis to provide a castering effect for said wheel as said golf cart and power unit are steered by said handle;

an electric motor carried on said driving frame;

and drive means on said driving frame connecting said motor and said wheels.

2. A combination according to claim 1 wherein said first pivotal attachment means comprises a pair of laterally spaced-apart attachment members.

3. A combination according to claim 2 wherein said driving frame is inclined generally rearwardly and downwardly from said second pivotal attachment means and wherein said ground wheel is journalled for rotation near the lower end of said inclined driving frame.

4. A combination according to claim 1 wherein said sleeve is mounted on said attaching frame and said shaft is mounted on said driving frame.

5. A combination according to claim 1 including electrical control means for energizing said motor from said battery and for regulating the speed of said motor, said control means comprising:

a power transistor mounted on said driving frame and connected in curcuit with said motor;

a manually operable controller mounted on said handle of said golf cart and including an on-off switch and a variable resistor for regulating the speed of said motor;

electrical conductors for operatively connecting said battery, said motor, said transistor and said controller;

and detachable connectors in said conductors to facilitate detachment of said golf cart, said attaching frame and said driving frame.

6. A combination according to claim 5 wherein said electrical conductors comprise, a first conductor for connecting one terminal of said motor to one terminal of said battery, a second conductor for connecting the other terminal of said battery to the emitter collector circuit of said transistor, a third conductor for connecting the base of said transistor to one side of said controller, a fourth conductor for connecting the other side of said controller to a point on said second conductor, and wherein said detachable connectors are provided in said first, second, third and fourth conductors to facilitate detachment of said golf cart, said attaching frame and said driving frame.

7. A combination according to claim 6 wherein said manually operable control means comprises a hollow tubular electrically conductive housing, a plunger axially movable within said housing and having a portion formed of electrical insulating material, biasing means within said housing and engageable with said plunger and tending to bias the latter to a position outwardly of said housing, a winding of electrical resistance wire rigidly mounted on said insulated portion of said plunger and extending axially therealong, and an electrically conductive pick-up member electrically and mechanically connected to said housing and slideably engageable with said winding at least when said plunger is depressed a predetermined distance against the bias of said biasing means, said winding and said pick-up member cooperatively related to define said variable resistor and said on-off switch means.

* * * * *